UNITED STATES PATENT OFFICE.

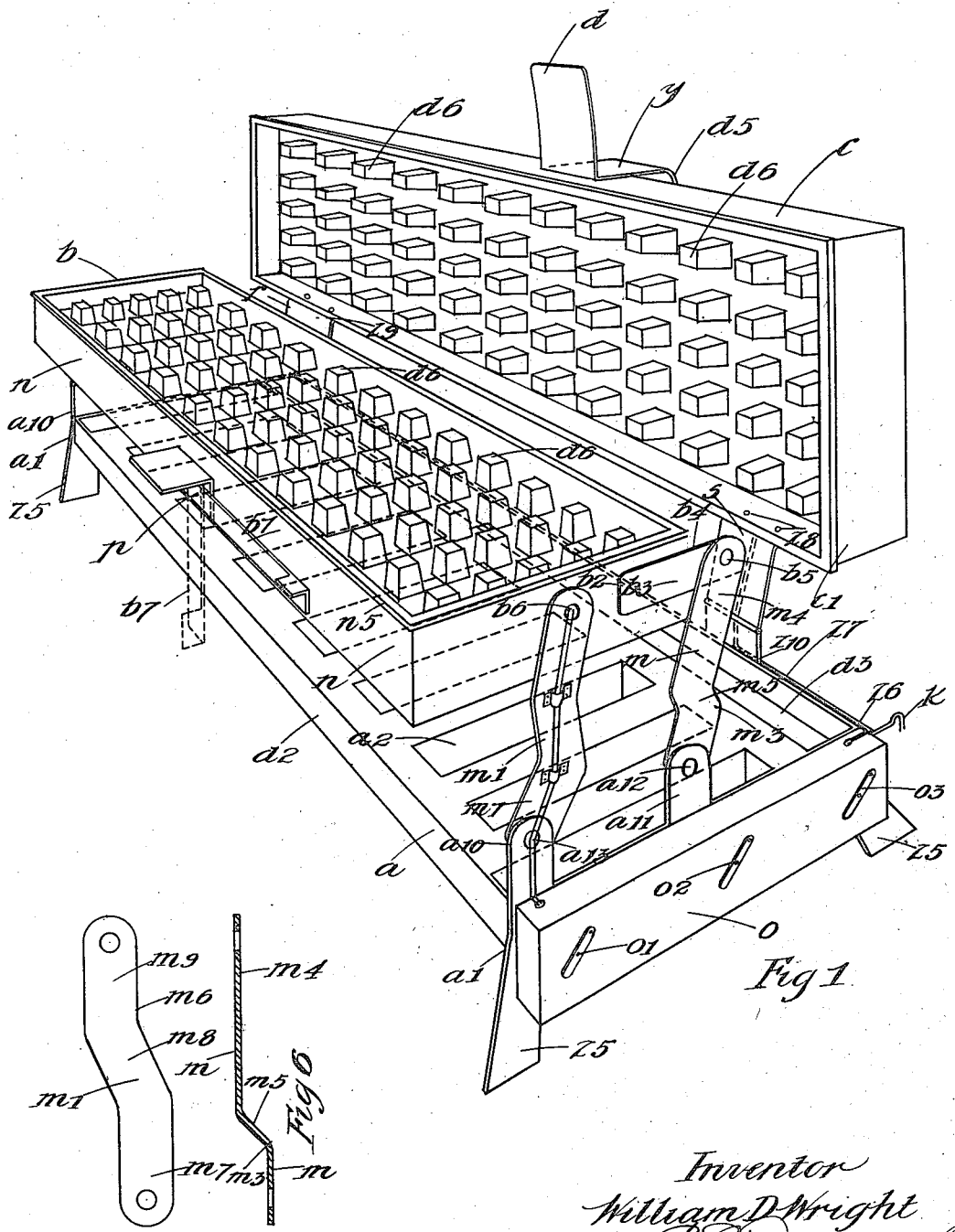

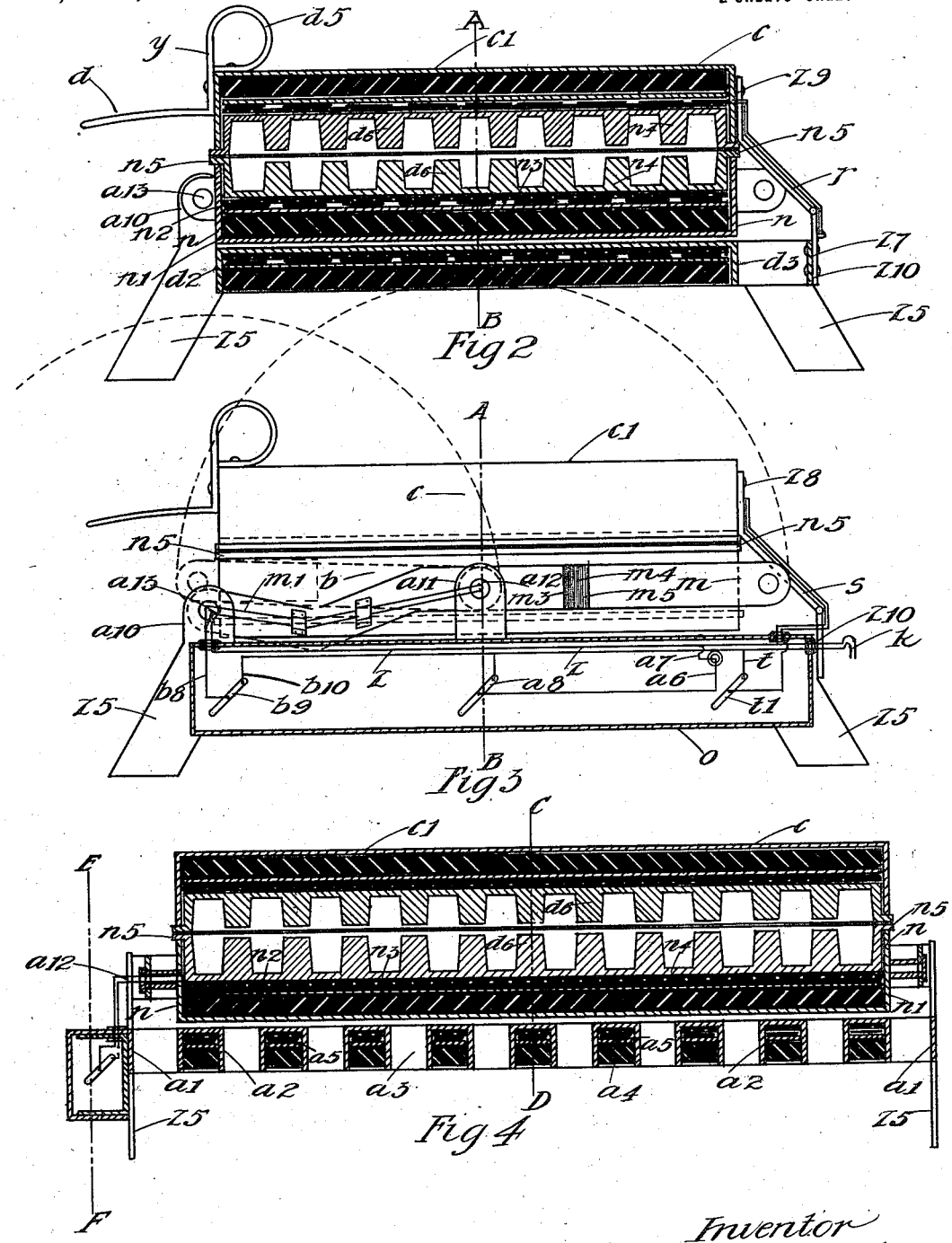

WILLIAM D. WRIGHT, OF SAN DIEGO, CALIFORNIA.

ELECTRIC COOKING APPARATUS.

1,214,486.     Specification of Letters Patent.     Patented Jan. 30, 1917.

Application filed February 5, 1916. Serial No. 76,266.

*To all whom it may concern:*

Be it known that I, WILLIAM D. WRIGHT, a citizen of the United States, residing at San Diego, in the county of San Diego, State of California, have invented certain new and useful Improvements in Electric Cooking Apparatus, of which the following is a specification.

My invention relates to improvements in electric heating apparatus, more particularly to be used for grilling and waffle baking purposes, but which may also be used for any purpose of the ordinary electrically heated stove, and which may be folded up so as to occupy a small space when not in use, and which provides a large heating surface when unfolded.

One of the objects of my invention is to provide a device of the kind which is so constructed that certain sections thereof may be heated and thus economize in the use of electric current.

Another object of my invention is to provide a new and novel construction of waffle iron.

Another object is to provide a device of the kind that may be quickly converted from one use to a different use, as from a waffle iron to a grill, or to a device providing a large heating surface when required.

These objects and others will more clearly appear from the accompanying drawings which form a part of my specification.

In the drawings similar characters refer to similar parts throughout.

In the drawings, Figure 1 is a perspective view of my device, showing the top waffle member turned back and the other waffle member above the grill member; Fig. 2 is a vertical cross sectional view through C—D in Fig. 4; Fig. 3 is an end elevational view with a part of the casing removed to better illustrate the electric wiring, Fig. 4 is a vertical sectional view through A—B in Fig. 2, Fig. 5 is a detail view of one of the swinging arms, and Fig. 6 is a longitudinal sectional view of the other swinging arm.

The principal parts of my invention are the base or grill member $a$, the lower waffle member $b$, and the upper waffle member $c$.

The member $a$ is supported at each end on a support $a^1$, which is provided with feet $z^5$. The member $a$ is in shape an oblong rectangle provided with cross-pieces $a^2$ disposed at regular intervals throughout its length, which form an integral part of the side pieces $d^2$ and $d^3$, leaving between said cross pieces open spaces $a^3$. The cross pieces $a^2$ and the side pieces $d^2$ and $d^3$ are all provided in their lower surfaces with deep longitudinal recesses $a^4$, in each of which is placed a heating element $a^5$ and electrically connected to one another. The elements $a^5$ are electrically connected by means of wires $a^6$ and $z$ which enter at point $a^7$, and the electric current into said member $a$ is controlled by the switch $a^8$.

The waffle member $b$ is preferably made of aluminum and may be of any shape desired, but my preferred construction is an oblong rectangular shape. The member $b$ is composed of an outer hollow casing $n$ which is preferably made of pressed steel and is provided with a recess or chamber sufficiently deep to contain the non-conductor $n^1$, the heating element $n^2$, the non-conducting element $n^3$ and the base portion of the metallic cooking surface member $n^4$, all in the order in which I have enumerated same. The metallic cooking surface member $n^4$ is provided on its circumference with a projecting shoulder $n^5$ which rests upon and covers the edge of the casing $n$. The member $b$ is enough shorter than the member $a$ so that the arms $m$ and $m^1$ on each end of the members $a$ and $b$ are of a length equal to the distance from $a^{12}$ to $a^{13}$, and they are inclined toward the member $b$ sufficiently to allow the member $b$ to be inverted so that the cooking surface of member $b$ may be brought directly above and face the member $a$, leaving a sufficient space between the members $a$ and $b$ to contain a slice of meat or other article for the purpose of grilling it.

The member $c$ is identical with member $b$ in structure, composition and arrangement of its parts, hence I shall not describe the member $c$ in detail.

Both of the members $b$ and $c$ are provided on their cooking surfaces with projections $d^6$ found in the ordinary waffle iron which are of a length so that they will have a space between their adjacent ends when the waffle surface of member $c$ is placed on the surface of member $b$ and the edges of member $c$ and $b$ are resting against each other, as shown best in Figs. 2 and 4.

The casing $c^1$ of the member $c$ corresponds in size, shape and form with the casing $n$. The casing $n$ and its contents are securely fastened together so that the member $b$ may be inverted without allowing any of its parts to become displaced, and the casing $c^1$ and its contents are similarly fastened together for the same purpose.

On each end of the member $a$ the support $a^1$ is provided with an upwardly extending portion $a^{10}$, and near the middle of said support $a^1$ there is provided a similar upwardly extending portion $a^{11}$ of the same height and size as $a^{10}$.

Rigidly mounted on the casing $n$ at $b^2$ is a support member $b^3$ having a projected portion $b^4$. Pivotally mounted on the support member $b^3$ at $b^5$, at its one end, and at its other end, similarly mounted at $a^{12}$ on the member $a^{11}$, is an arm member $m$. Pivotally mounted at its one end near the middle of the end portion of the casing $n$ at $b^6$, and at its other end pivotally mounted in the portion $a^{10}$ at $a^{13}$, is another swinging arm $m^1$. Arms similar to arms $m$ and $m^1$ and of the same shape and length are similarly mounted on the support $a^1$ and casing $n$ at the opposite end of the casing $n$. The arm $m$ at $m^3$ is bent so as to throw the upper end $m^4$ thereof toward the support $b^3$, thereby forming a shoulder $m^5$ on which the arm $m^1$ at point $m^6$ may rest when member $b$ is inverted, and its waffle surface is placed adjacent to the cooking surface of member $a$. The arm $m^1$ is provided with a straight portion $m^7$ which is pivoted on the support $a^{10}$ at $a^{13}$, a middle portion $m^8$ which rises at an oblique angle to $m^7$ and inclines toward the member $b$ and the other end portion $m^9$ which is parallel to the end of casing $n$ and is pivoted to it at $b^6$.

It will be noticed that if the member $b$, in the position shown in Fig. 1, be moved toward the left, the member $b$ will be held in a level position by the arms $m$ and $m^1$, and when the end of arm $m$ at $b^5$ drops to the horizontal plane of $a^{12}$ and $a^{13}$ the extended edge of $b$ may be caused to rise, so that the member $b$ will revolve on the pivots $b^6$ until the arm $m^1$ rests on the shoulder $m^5$ of arm $m$, when the waffle surface of member $b$ will be adjacent to and directly over the cooking surface of member $a$, and furnish a cooking surface to act on anything being cooked on member $a$. These arms $m$ and $m^1$ are adapted to hold the member $b$ at all times in a level position relatively to the upper surface of the member $a$, and to allow the member $b$ to be swung to one side of the member $a$ when so desired or to be reversed and placed over member $a$. A support $b^7$ is pivotally mounted at $p$ on the side of the casing $n$ which is adapted to drop into the position shown by the dotted lines in Fig. 1 to support the member $b$ when it is not resting on the member $a$. The heating element in the member $b$ is electrically connected to the wires $b^8$, $b^{10}$ and $z$, which are controlled by the switch $b^9$. Firmly mounted on the support members $a^1$ at each end at $z^6$ is another support member $z^7$.

The member $c$ is mounted, by means of hinges $r$ and $s$, which are each mounted at one end on the casing $c^1$ at $z^8$ and $z^9$, and on the support $z^7$ at $z^{10}$. These hinges $r$ and $s$ are similar in size and shape, and are of a size to allow the cooking surface of the member $c$, when said member is turned back on said hinges, to be level with the top of member $a$. The member $c$ is also provided on its side opposite to the hinged side with a member $y$ having a straight projecting portion $d$ adapted to facilitate the revolving of the member $c$ on the hinges $r$ and $s$. The member $y$ is also provided with a curved portion $d^5$ which is adapted to act as a support for the member $c$ when it is turned on the hinges $r$ and $s$ to its reversed position.

The heating element in the member $c$ is electrically connected to wires $z$ and $t$ which are controlled by the switch $t^1$. The wires connecting with the heating elements in all the parts are electrically connected to the main wires $k$. A hollow casing $o$ is mounted on the support $a^1$ at the end of the member $a$ where the electric conducting wires enter said member $a$. This casing $o$ is adapted for concealing and protecting the said electric conducting wires. Mounted in said casing $o$ are electric switch buttons $o^1$, $o^2$, and $o^3$ respectively adapted to operate the switches $b^9$, $a^8$ and $t^1$.

In operation for baking waffles the members $b$ and $c$ are placed with member $b$ resting on the member $a$, and the member $c$, in the positions shown in Fig. 1. The waffle batter is poured on the cooking surface of the member $b$ after which the member $c$ is revolved on the hinges $r$ and $s$ until its cooking surface is directly above the cooking surface of the member $b$ and the edge of the cooking member $n^4$ rests upon the edge of the similar cooking member of the member $b$. The electric current, by means of the switch buttons $o^1$ and $o^3$ is turned into the heating elements $b$ and $c$ and the current through the member $a$ may be switched off by means of the switch button $o^2$.

By reason of both waffle cooking surfaces being made of aluminum no lubrication is required on the said cooking surfaces and the waffles are cooked evenly on both sides at the same time.

If my device is desired to be used for a grill, only, the member $c$ may be revolved on the hinges $r$ and $s$ until the support $d^5$ rests on the table or support on which the supports $a^1$ are resting, and the member $b$, by means of the arms $m$ and $m^1$, may be swung to the other side of the member $a$ until the support $b^7$ rests on the table or other support on which the members $a^1$ are supported. The electric current may be cut out of the members $b$ and $c$ by the use of the switch buttons $o^1$ and $o^3$, and then the member $a$ may be used as a grill or for any other purpose by switching on the current in said member by the use of the switch button $o^2$, or if it is desired to cook both sides of the article on member $a$ at the same time, the member $b$ may be revolved on pivots $b^5$ and $b^6$ until the arm $m^1$ rests on the shoulder $m^5$ of arm $m$ and the cooking surface of member $b$ will be directly over member $a$, resting against, or very close to the article being cooked, and the electric current is then turned into the member $b$ as well as member $a$.

In case it is desired to use my device for the general heating of cooking utensils or other articles where a large heating surface is required, the electric current may be turned into all three of the members $a$, $b$ and $c$ and the heating surface of all three of said members may be utilized.

Although I have described my improvements with considerable detail and with respect to certain particular forms of my invention, I do not desire to be limited to such details since many changes and modifications may well be made without departing from the spirit and scope of my invention in its broadest aspect.

Having fully described my improvements, what I claim as new and desire to secure by Letters Patent, is:

1. In a device of the kind described, a grill member mounted at each end on a support, a horizontal support parallel to said grill member mounted at each end of one of said supports, a plurality of swinging arms each mounted at one end on extended portions of said first named supports, a waffle member pivotally mounted on the other ends of said swinging arms, a plurality of hinges each mounted at one end on said horizontal support, another waffle member mounted on the other ends of said hinges, electric heating elements mounted in said grill member and each of said waffle members, and electric conducting wires connected to each of said heating elements and an electric current supply.

2. In combination with an electric grill member, a plurality of swinging arms each pivotally mounted at one end on supports attached to said grill member, another electrically heated member revolubly mounted on the other ends of said swinging arms, said arms being adapted to form a support for said revolving member and hold the cooking surface thereof in its reversed position at a certain distance from the cooking surface of said grill member, and electric means for heating said grill member and said revoluble member, electrically connected to an electric supply circuit.

3. In a device of the kind described, a pair of support members, a grill member mounted at each end on one of said support members, and provided with a plurality of longitudinal parallel portions and a plurality of parallel cross-pieces forming an integral part of said longitudinal parallel portions, each of said longitudinal portions and cross pieces provided in its lower surface with a longitudinal groove, an electric heating element mounted in each of said grooves and electrically connected to one another and to an electric current supply source, a plurality of swinging arms each revolubly mounted at one end on said supports, another member provided with a waffle-baking surface revolubly mounted on the ends of said swinging arms, an electric heating element mounted in said last named member, said member being adapted to be placed in its inverted position directly above and adjacent to said grill member, or to be swung to one side of said grill member.

4. In a device of the kind described, the combination of two electrically heated members each provided with an aluminum waffle baking surface, swinging arm members upon which one of said electrically heated members is revolubly mounted, and a support upon which the other electrically heated member is hinged, whereby said electrically heated members are adapted to be moved on said swinging arms and said hinges into a position where the waffle baking surfaces may be placed together so that the edges of said baking surfaces will rest firmly against each other.

5. A folding electric cooking apparatus comprising two support members, a grill member firmly mounted at each end on one of said support members, a plurality of swinging arms having one end of each arm pivotally mounted on said support members, a horizontal support member mounted at its ends on said first mentioned support members, another cooking member revolubly mounted on the other ends of said swinging arms, and a third cooking member mounted on a plurality of hinges each attached at its one end to the wall of said member and at its other end to said horizontal support member, all of said cooking members being adapted to be superposed one above the other in a compact form.

6. In a device of the class described, a pair of casings pivotally connected together, a waffle member provided with an aluminum baking surface mounted in each of said casings so that each of said aluminum baking surfaces covers the upper edge of one of said casings, and means mounted in said casings between said casings and said waffle members for electrically heating said waffle members.

7. In a device of the class described, a pair of casings pivotally connected together, a waffle member provided with aluminum baking surfaces mounted in each of said casings so that their surfaces extend past the edges of said casings, means mounted in said casings between said casings and said waffle members for electrically heating said waffle members, consisting of an electrical heating element adjacent said waffle member and a non-conducting element spacing said electrical heating element from said casing.

8. In a device of the class described, a pair of box-shaped casings pivotally connected together so as to fold one upon the other, a waffle member mounted in each of said casings provided with outwardly extending flanges extending past the edges of said casing, whereby said waffle members are supported on the edge of said casing and spaced apart from the bottom thereof, and electrical means mounted in the space between said waffle member and said casing for heating said waffle member.

9. In a device of the class described, a pair of box-shaped casings pivotally connected together so as to fold one upon the other, a waffle member mounted in each of said casings provided with outwardly extending flanges extending past the edges of said casing, whereby said waffle members are supported on the edge of said casing and spaced apart from the bottom thereof, electrical means mounted in the space between said waffle member and said casing for heating said waffle member, consisting of an electrical heating element adjacent said waffle member and a non-conducting element spacing said electrical heating element from said casing.

In testimony whereof, I have hereunto subscribed my name in the presence of two subscribing witnesses.

WILLIAM D. WRIGHT.

Witnesses:
 INNICE C. CRANE,
 MINNIE KORTE.